US006384185B1

(12) United States Patent
Inada et al.

(10) Patent No.: US 6,384,185 B1
(45) Date of Patent: May 7, 2002

(54) PROCESS FOR PURIFYING POLYCARBONATE RESIN SOLUTION

(75) Inventors: Minoru Inada; Tatsuhide Hosomi; Toshiaki Asoh; Makoto Mizutani, all of Ibaraki-ken (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/477,729

(22) Filed: Jan. 5, 2000

(30) Foreign Application Priority Data

| Jan. 11, 1999 | (JP) | 11-004278 |
|---|---|---|
| Jul. 23, 1999 | (JP) | 11-209280 |

(51) Int. Cl.⁷ .............. C08G 64/40; C08J 3/03; C08J 3/07; C08J 3/09
(52) U.S. Cl. ............ 528/491; 528/485; 528/499; 528/502 A; 210/644; 210/767; 210/791; 210/799
(58) Field of Search .................. 528/485, 491, 528/499, 502 A; 210/644, 767, 791, 799

(56) References Cited

U.S. PATENT DOCUMENTS 4,316,009 A * 2/1982 Rinaldi et al. ............ 528/502
4,323,519 A * 4/1982 Mori et al. ............... 528/499

FOREIGN PATENT DOCUMENTS

| EP | 0014462 | 8/1980 |
| GB | 1082810 | 9/1967 |
| JP | 5-186583 | 7/1993 |
| JP | 7-309940 | 11/1995 |
| JP | 9-52949 | 2/1997 |
| JP | 9-104747 | 4/1997 |
| JP | 9104747 | 4/1997 |

OTHER PUBLICATIONS

Sax et al.; *Hawley's Condensed Chemical Dictionary, Eleventh Edition*; Van Nostrand Reinhold; New York; 1987; pp. 586, 587, 633, 796.*
Abstract, XP–2171550, Idemitsu Petrochem Co., "Preparation of purified polycarbonate solution—comprises washing crude solution with water under stirring and filtering separated organic . . . diameter", 1997.
Abstract, XP–002171549, Unix Co., Ltd., Japan, "Filtering materials", Sep. 12, 1988.

* cited by examiner

Primary Examiner—Rabon Sergent
(74) Attorney, Agent, or Firm—Sughrue Mion, PLLC

(57) ABSTRACT

A process for purifying a polycarbonate resin solution which comprises passing a water-in-oil dispersion type (W/O) emulsion composed of a mixture of an organic solvent solution containing a polycarbonate resin with a aqueous solution and having water particles with an average diameter of 1 to 100 $\mu$m in an oil through a metallic filter having a filtering precision of 10 to 200 $\mu$m, and then, settling the mixture for 1 to 30 minutes to perform separation between the organic solvent solution containing a polycarbonate resin and the aqueous solution containing contaminations.

13 Claims, No Drawings

PROCESS FOR PURIFYING POLYCARBONATE RESIN SOLUTION

BACKGROUND OF THE INVENTION

1) Field on the Invention

The present invention relates to a process for purifying a polycarbonate resin solution and more particularly to a process for purifying a polycarbonate resin solution by efficient separation between an organic solvent solution of the polycarbonate resin and an aqueous solution containing contaminations from a polycarbonate resin emulsion.

2) Prior art

Presently, as a process for producing a polycarbonate resin, a conventional process for producing a polycarbonate resin by an interfacial polycondensation method using a halogenated organic solvent such as methylene chloride is applied. In the process for producing a polycarbonate resin by the interfacial polycondensation method, a mixture of an organic solvent solution of a polycarbonate resin (hereinafter, sometimes abbreviated as "oil phase" or "O") with an aqueous solution (hereinafter, sometimes abbreviated as "W") is obtained at the time of the completion of the polycondensation. Since the organic phase containing a polycarbonate resin contains contaminations as by-products during the polycondensation and an alkali aqueous solution and forms an emulsion, separation between the organic solvent solution and the aqueous solution from the emulsion need to be performed.

Moreover, in order to remove a very small amount of contaminations remained in the organic solvent solution of a polycarbonate resin, a method for rinsing out the contaminations by adding an alkali aqueous solution, an acidic aqueous solution, pure water, etc., is usually applied. However, in the method, when a mixture of a polycarbonate resin solution and a rinsing liquid is vigorously stirred, an emulsion often forms.

Hitherto, in order to perform separation between the organic solvent solution and the aqueous solution from the emulsion, a liquid-liquid centrifugal separator or a settler has been used. However, when the emulsion is separated with a centrifugal separator, the centrifugal separator itself is not only expensive, but also maintenance cost of the centrifugal separator and electric power for its operation become very large. Further, unplanned stopping of the centrifugal separator has been often caused due to failure and abrasion of driving portion or rotating portion.

The separation by settling caused defects that a settler and hold-up time became large in order to ensure hold up time for separation, even if a separation plate or a baffle plate is inserted inside.

As methods to solve such problems, processes of separation by aggregation are known, for example, Japanese Patent Publication No. 46-41622 discloses a process for separation comprising passing a polycarbonate resin solution through a filtering layer having a contact angle with water of 40° or below. However, in the process, since it was comparatively difficult to separate minute water particles, it was necessary to pass repeatedly the polycarbonate resin solution through the filtering layer. Further, since contamination from a material of the filtering layer occurred and it took a time for separation after passing through the filtering layer, comparatively large settler was required.

Further, Japanese Patent Kokai (Laid-open) No. 7-309940 discloses a process of separation comprising mixing a polycarbonate resin solution with an aqueous washing liquid to form an oil droplet-in-water type emulsion and performing washing and then passing the emulsion thus washed through a filtering material. However, in the process, since a treating quantity for separation was increased, there caused problems that a large scale of instrument for separation and waste water disposal facility were required.

Japanese Patent Kokai (Laid-open) No.55-104316 discloses a process for separation between the organic solvent phase and the aqueous phase comprising passing a polycarbonate resin solution emulsified with an aqueous washing liquid of pH 2 to 14 through a fiber layer with a depth of 10 to 500 mm and an apparent density of 0.2 to 0.7 g/ml at a space velocity of 0.01 to 2 cm/second. However, the process caused defects that since the filtering layer had a large depth, pressure loss through the filtering layer due to the filler occurred, and the filtering material was flowed out and a settler was necessary.

Japanese Patent Kokai (Laid-open) No. 9-104747 discloses a process which comprises washing a crude polycarbonate solution with washing water under stirring and then performing separation between the water phase and the organic phase containing a polycarbonate resin from the crude polycarbonate resin containing the washing water by settling or centrifugal separation and filtering the organic phase containing a polycarbonate resin through a filter with pore size 20 to 180 $\mu$m at a filtering velocity of 60 to 1000 mm/min. However, in the process, although settling or centrifugal separation should be performed before filtering with a filter, it was very difficult to separate an emulsion composed of the organic solvent solution of a polycarbonate resin and the aqueous solution by settling, and even if it is possible to separate, a settler becomes very large since a long time is necessary to ensure hold-up time. Moreover, when centrifugal separation is performed, as described above, maintenance cost of centrifugal separator and electric power for its operation become very large and it is necessary to provide a spare centrifugal separator for unplanned stopping of centrifugal separator, so that operation becomes complicated.

On the other hand, in molded articles in which mixing-in of dusts need be diminished as much as possible, for example, molded articles such as compact disc, laser disc, optical card, MO disc and DVD utilized characteristics of polycarbonate including transparency, heat resistance, hydrolysis resistance and dimension stability, reduction of dusts has been required since mixing-in of dusts exerts bad influence on reading and writing of signals of submicron.

It is preferable that polycarbonate resin as an optical material contains a small quantity of "dust" as far as possible. The "dust" herein is a substance having a short diameter 0.5 $\mu$m or above derived from dusts and rubbishs in the atmosphere, contaminations contained in raw materials, floating substances remained in a solvent, metal powders due to abrasion of pneumatic pipes or instruments, etc., which causes troubles such as reading errors, writing errors by remaining in an optical disc and can be determined according to measuring equipments such as optical microscope and minute particle counter obtainable on the market.

SUMMARY OF THE INVENTION

An object of the present invention is to overcome above-mentioned defects of prior art and provide a process for purifying a polycarbonate resin solution by efficient separation between an organic solvent solution of the polycarbonate resin and an aqueous solution containing contaminations from a polycarbonate resin solution.

As a result of extensive studies to solve above-mentioned prior art problems, the inventors have found that when an water-in-oil dispersion type (W/O) emulsion composed of a mixture of an organic solvent solution with an aqueous solution and having water particles with an average diameter 1 to 100 µm in an oil is passed through a metallic filter having a filtering precision of 10 to 200 µm, a water phase in the emulsion is temporarily captured with the metallic filtering material and then the water particles are efficiently aggregated and grown on the metallic filter surface at the time of extrusion from the metallic filter and the mixture of the oil phase with the aqueous phase is passed through the metallic filter without remaining on the metallic filter, and then separation between the organic solvent solution of the polycarbonate resin and the aqueous solution containing contaminations can be readily performed by settling of the mixture of the oil phase with the aqueous phase passed through the filter for a prescribed time, thereby obtaining a polycarbonate resin solution reduced contaminations and dusts, and have accomplished the present invention.

That is, the present invention provides a process for purifying a polycarbonate resin solution which comprises:

passing a water-in-oil dispersion type (W/O) emulsion composed of a mixture of an organic solvent solution containing a polycarbonate resin with a aqueous solution and having water particles with an average diameter of 1 to 100 µm in an oil through a metallic filter having a filtering precision of 10 to 200 µm, and then, settling the mixture for 1 to 30 minutes to perform separation between the organic solvent solution containing a polycarbonate resin and the aqueous solution.

Further, the present invention provides a process for purifying a polycarbonate resin solution which comprises:

passing a water-in-oil dispersion type (W/O) emulsion composed of a mixture of an organic solvent solution containing a polycarbonate resin with a aqueous solution and having water particles with an average diameter of 1 to 100 µm in an oil through a primary metallic filter having a filtering precision of 1 to 100 µm, then, passing the mixture through a secondary metallic filter having a filtering precision of 1.1 to 20 times to a filtering precision of said primary metallic filter, and then, performing separation between the organic solvent solution containing a polycarbonate resin and the aqueous solution.

The present invention provides also a process for purifying a polycarbonate resin solution which comprises:

passing a water-in-oil dispersion type (W/O) emulsion composed of a mixture of an organic solvent solution containing a polycarbonate resin with a aqueous solution and having water particles with an average diameter of 1 to 100 µm in an oil through an acid-treated in advance metallic filter having a filtering precision of 10 to 200 µm, and then, performing separation between the organic solvent solution containing a polycarbonate resin and the aqueous solution.

DETAILED DESCRIPTION OF THE INVENTION

The present invention will be described in detail below.

The process for a polycarbonate resin of the present invention comprises the same process as prior process for producing a polycarbonate resin, i.e., a solution process including an interfacial polymerization process and a pyridine process comprising reacting dihydric phenol with phosgene in the presence of a small amount of a molecular weight modifier and optionally a branching agent. Solvent soluble polycarbonates such as aromatic homo- or co-polycarbonates used conventional bisphenols, branched polycarbonates and polycarbonates introduced a long chain alkyl group(s) of terminal modifier, having a viscosity average molecular weight of 1,000 to 100,000 are applicable. Further, styrene-grafted products of a polycarbonate having carbon-carbon double bonds as terminal stopping agent or comonomer and copolymers of polystyrene having a phenolic hydroxyl group(s) with a polycarbonate also are applicable. As conventional aromatic polycarbonate, particularly, polycarbonates used 2,2-bis(4-hydroxyphenyl) propane [bisphenol A] is exemplified. Polycarbonate copolymers obtainable by combination of bisphenol A and 1,1-(4-hydroxyphenyl)cyclohexane[bisphenol Z] or 2,2-bis (4-hydroxy-3,5-dibromo phenyl)propane [tetrabromobisphenol A], branched products thereof and long chain alkyl terminal-modified products thereof also are applicable.

Examples of the bisphenol to be used in the present invention include bis(hydroxyaryl)alkanes including bis(4-hydroxphenyl)methane, bis(3-methyl-4-hydroxphenyl) methane, bis(3-chloro-4-hydroxphenyl)methane, bis(3,5-dibromo-4-hydroxphenyl)methane, 1,1-bis(4-hydroxphenyl)ethane, 1,1-bis(2-t-butyl-4-hydroxy-3-methylphenyl)ethane, 1,1-bis(2-t-butyl-4-hydroxy-5-methylphenyl)ethane, 1-phenyl-1,1-bis(4-hydroxy-3-methylphenyl)ethane, 2,2-bis(4-hydroxyphenyl)propane (bisphenolA; BPA), 2,2-bis(3,5-dibromo-4-hydroxyphenyl) propane(TBA), 2,2-bis(4-hydroxyphenyl)butane, 2,2-bis(2-methyl-4-hydroxyphenyl)propane, 2,2-bis(4-hydroxy-3,5-dichlorophenyl)propane, 2,2-bis(4-hydroxy-3,5-difluorophenyl)propane, 2,2-bis(4-hydroxy-3,5-dimethylphenyl)propane, 2,2-bis(4-hydroxy-3-bromophenyl)propane, 2,2-bis(4-hydroxy-3-chlorophenyl) propane, 2,2-bis(4-hydroxy-3-methylphenyl)propane, 2,2-bis(4-hydroxy-3-fluorophenyl)propane, 2,2-bis(4-hydroxyphenyl)octane, 1,1-bis(4-hydroxyphenyl)-1-phenylethane, 2,2-bis(4-hydroxy-3-methylphenyl)propane, 2,2-bis(3-bromo-4-hydroxy-5-chlorophenyl)propane, 2,2-bis(3-phenyl-4-hydroxyphenyl)propane, 1,1-bis(2-n-butyl-4-hydroxy-5-methylphenyl)butane, 1,1-bis(2-t-butyl-4-hydroxy-5-methylphenyl)butane, 1,1-bis(2-t-butyl-4-hydroxy-5-methylphenyl)isobutane, 1,1-bis(2-t-amyl-4-hydroxy-5-methylphenyl)butane, 1,1-bis (3,5-dichloro-4-hydroxyphenyl)butane, 1,1-bis(3,5-dibromo-4-hydroxyphenyl)butane, 4,4-bis(4-hydroxyphenyl)heptane, 1,1-bis(2-t-butyl-4-hyroxy-5-methylphenyl)heptane, 2,2-bis (4-hydroxyphenyl)octane and 1,1-bis(4-hydroxyphenyl) ethane; bis(4-hydroxyphenyl)cycloalkanes including 1,1-bis (4-hydroxyphenyl)cyclopentane, 1,1-bis(4-hydroxyphenyl) cyclohexane(bisphenol Z; BPZ), 1,1-bis(3-methyl-4-hydroxyphenyl)cyclohexane, 1,1-bis(3-cyclohexyl-4-hydroxyphenyl)cyclohexane, 1,1-bis(3-phenyl-4-hydroxyphenyl)cyclohexane and 1,1-bis(4-hydroxyphenyl)-3,5,5-trimethylcyclohexane; dihydroxybiphenyls including 4,4'-dihydroxyphenyl, 4,4'-dihydroxy-2,2'-dimethylbiphenyl, 4,4'-dihydroxy-3,3'-dimethylbiphenyl and 4,4'-dihydroxy-3,3'-dicyclohexylbiphenyl; bis (hydroxyaryl)ethers including bis(4-hydroxyphenyl)ether and bis(4-hydroxy-3-methylphenyl)ether; bis(hydroxyaryl) sulfones including bis(4-hydroxyphenyl)sulfone and bis(3-methyl-4-hydroxyphenyl)sulfone; bis(hydroxyaryl) sulfoxides including bis(4-hydroxyphenyl)sulfoxides including bis(4-hydroxyphenyl)sulfoxide and bis(3-methyl- 4-hydroxyphenyl)sulfoxide and bis(3-phenyl-4-hydroxyphenyl)sulfoxide; bis(hydroxyaryl)sulfides including bis(4-hydroxyphenyl)sulfide and bis(3-methyl-4-hydroxyphenyl)sulfide; bis(4-hydroxyphenyl)ketone and siloxanes modified both terminals with phenol and a combination of two kinds or above thereof. Among them, bisphenol A, 1,1-bis(4-hyroxyphenyl)cyclohexane and 2,2-bis(3,5,-dibromo-4-hydroxyphenyl)propane are preferble.

Examples of the terminal stopping agent or the molecular weight modifier include compounds having monohydric phenolic hydroxyl group including conventional phenol, p-t-butyl phenol, tribromo phenol, long chain alkyl phenol, aliphatic carbonyl chloride, aliphatic carboxylic acid, aromatic carboxylic acid, aromatic carbonyl chloride, hydroxy benzoic acid alkylester and alkyl ether phenol. Further, phenols having a reactive double bond(s) also may be used as the termial stopping agent. Examples of such phenols include phenols having an unsaturated group(s) including unsaturated carboxylic acids such as acrylic acid, vinyl acetate, 2-pentenoic acid, 3-pentenoic acid, 5-hexenoic acid and 9-undecenoic acid; acid chlorides or chloroformates such as acrylic chloride, sorbic chloride, allyl alcohol chlorofromate, isopropenyl phenol chloroformate and hydroxystyrene chloroformate; phenols having an unsaturated group(s) such as isopropenyl phenol, hydroxystyrene, hydroxyphenyl maleimide, hydroxy benzoic acid allyl ester and hydroxy benzoic acid methylallyl ester.

The above-mentioned compounds may be used in combination of conventional terminal modifiers and usually in the range of 1 to 25 mol % and preferable in the range of 1.5 to 10 mol % per 1 mol of above-mentioned dihydric phenol compounds.

Examples of organic solvents to be used in the reaction include chlorinated hydrocarbons including dichloromethane, 1,2-dichloroethane, chloroform, chlorobenzene, 1,1,1-trichloroethane and carbon tetrachloride; aromatic hydrocarbons including benzene and toluene; ether compounds including diethylether and a mixture of two species or above thereof.

Branched polycarbonates can be produced by combination of above-mentioned branching agent in the range of 0.01 to 5 mol % and preferably in the range of 0.1 to 3.0 mol % to above-mentioned dihydric phenol compound. Examples of the branching agent include polyhydroxy compounds including phloroglucine, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)benzene, 1,1,1-tri(4-hydroxyphenyl)ethane, 2,6-bis(2-hydroxy-5-methylbenzyl)-4-methyl phenol and $\alpha$, $\alpha'$, $\alpha''$-tri(4-hydroxyphenyl)-1,3,5-triisopropyl benzene, 3,3-bis(4-hydroxyphenyl)oxyindole(=isatinbisphenol), 5-chloroisatinbisphenol, 5,7-dichloroisatinbisphenol and 5-bromoisatinbisphenol.

The molecular weight of the polycarbonate resin is in the range of viscosity average molecular weight 1,000 to 100,000 and considering from properties to be required such as impact resistance and abrasion resistance of molded article and molding, preferably in the range of viscosity average molecular weight 5,000 to 50,000.

Usually, the interfacial polycondensation comprises reacting an aromatic bisphenol compound dissolved in a caustic alkali aqueous solution with phosgene in the presence of an organic solvent under agitation, if necessary, adding a polycondensation catalyst thereto. It is preferable that the concentration of polycarbonate resin in the polycondensation reaction is 30% by weight or below as an organic solvent solution. When the concentration of polycarbonate resin is too high, it is not preferable since viscosity of the reaction mixture becomes high.

After the completion of polycondensation reaction, a mixture composed of an organic solvent solution of a polycarbonate resin (oil phase) and an aqueous solution containing contaminations such as chlorides, carbonates and caustic alkali as by-products (aqueous phase) is obtained. The mixture after the completion of the polycondensation is W/O (water-in oil dispersion type) in many cases, and rarely separates into the oil phase and the aqueous phase. However, usually, after the separation, some water is still contained in the oil phase and minute particles of the polycarbonate resin solution floats in the aqueous phase.

Further, as a process for obtaining a high purity of polycarbonate resin solution in which contaminations have removed from an organic solvent solution of a polycarbonate resin, a process for purifying a polycarbonate resin solution comprising adding a washing water such as an alkaline aqueous solution, an acidic aqueous solution and pure water to the organic solvent solution of a polycarbonate resin to mix with stirring is applied. Such washing may be applied in combination of two species or above, which can be applied also to the present invention.

Any instruments intended liquid-liquid mixing obtainable on the market can be used in mixing of an organic solvent solution of a polycarbonate resin with washing water. In order to obtain desired stirring efficiency, one-direction rotation type agitator, reciprocal inversion type stirrers, inline mixers, static mixers, orifice mixers, fullzones (manufactured by Shinko Pantec k. k., Japan), maxblend (manufactured by Sumitomo Jukikai Kogyo k. k., Japan), homomixer (manufactured by Tokushukika Kogyo k. k., Japan) or Sulzer mixer( manufactured by Sumitomo Jukikai Kogyo k. k., Japan) are suitable.

Emulsion composed of an oil phase and an aqueous phase includes O/W (oil-in-water type emulsion and W/O (water-in-oil type) emulsion. In the present invention, in order to reduce waste water, W/O (water-in-oil type) emulsion is formed. The diameter of water particles in an oil phase is preferably average 1 to 100 $\mu$m, depending upon concentration of polycarbonate resin solution, pH of aqueous solution, species of washing water and volume ratio of an oil phase to an aqueous phase. When the diameter of water particlesis above average 100 $\mu$m, it is not preferable since washing effects are diminished, whereas below average 1 $\mu$m, it is not preferable since separation efficiency is lowered.

In the present invention, since the organic solvent solution of a polycarbonate resin mixed with washing water has above-mentioned average diameter of water particles, an emulsion is usually formed without separating readily into an oil phase and an aqueous phase, even if stirring is stopped.

It is preferable that the emulsion has a viscosity of 10 to 500 cp. In order to make the viscosity of the emulsion smaller than 10 cp, the polycarbonate resin solution need be diluted with an organic solvent, so that it is not preferable since a treating quantity for a filter is increased. When the viscosity is above 500 cp, it is not preferable since the aggregation function of water particles on a filtering material is deteriorated or pressure loss through a filter becomes large.

In the process of the present invention, the emulsion composed of a mixture of an organic solvent solution of a polycarbonate with an aqueous solution formed at the time of the completion of polycondensation or in the purifying step with washing water is passed through a metallic filter. When the emulsion is passed through the metallic filter, minute water particles are captured with a filtering material constituting the metallic filter and then the water particles extruded from the filtering material are efficiently aggregated and grown on the filtering material, and the mixture of the oil phase with the aqueous phase are passed through the metallic filter without remaining on the metallic filter.

The metallic filter has preferably a filtering precision of 10 to 200 $\mu$m and more preferably 10 to 100 $\mu$m. The filtering precision defined in the present invention means absolute filtering precision in which a filtering efficiency of hard contamination in a specified pore diameter of the metallic filter is 100%.

When the filtering precision of the filter is below 10 $\mu$m, the aggregation effect of water particles is increased, but blockage of the filter due to contamination occurs and pressure loss through the filter is increased, so that it is not preferable since running cost for regeneration or renewal of the filter is increased. Further, when the filtering precision of the filter is above 200 $\mu$m, the aggregation effect of water particles is decreased, so that it is not preferable since separation of emulsion become unsatisfactory.

It is preferable that linear velocity of the polycarbonate resin emulsion during passing through the filter, i.e., filtering velocity is selected from the range of 0.01 to 20 cm/sec. When the filtering velocity is below 0.01 cm/sec, it is not preferable since the number of filter to be required is increased, so that an apparatus becomes a large scale, whereas above 20 cm/sec separation of the emulsion through the filter becomes insufficient, so that it is not preferable since complete separation cannot be attained in settling of post step.

The metallic filter is preferably formed of a metallic fiber and more preferably of non-woven fabric.

The material of the metallic filter is not limited. From the viewpoint of aggregation effect, pressure loss through the filter, solvent resistance and corrosion resistance, it is preferable to use an austenitic stainless steel or a nickel alloy, particularly, at least one material selected from the group consisting of SUS304, SUS304L, SUS316, SUS316L, SUS317, SUS317L and SUS347 or hastelloy, incoloy or monel.

Regarding the depth of the filter, the larger the depth is in the degree to cause no problem for pressure loss through the filter, the larger effect is provided. The depth of the filter is usually 0.1 mm to 200 mm, preferably 0.1 to 100 mm and more preferably 0.2 to 50 mm.

According to above-mentioned procedure, the emulsion composed of an organic solvent solution of polycarbonate resin and an aqueous solution is overflowed accompanying separation between the oil phase and the aqueous phase. However, although water particles become larger than those in the state of emulsion, separation between the oil phase and the aqueous phase is not perfectly performed. Accordingly, in the present invention, the mixed liquid overflowed from the filter is settled for 1 to 30 minutes, whereby separation between the oil phase and the aqueous phase is perfectly performed. When the settling time is below one minute, separation effect is not sufficient, whereas above 30 minutes it is not preferable since a large settler becomes necessary. The settler may be a simple residence vessel or a settler used known arts including a inclination plate.

Further, when settling is performed for the mixed liquid overflowed from the filter, dusts contained in the emulsion are gathered in the interface between the oil phase and the aqueous phase, whereby the concentration of dusts in the organic solvent solution of polycarbonate is lowered. In order to immigrate efficiently dusts from the oil phase to the vicinity of the interface, as described above, settling for 1 to 30 minutes becomes necessary. In a continuous operation, although dusts are accumulated in the interface between the oil phase and the aqueous phase, it is preferable to remove the oil phase and the aqueous phase in the vicinity of the interface and transfer to a polycondensation step or a recovery step of unreacted phenol to treat.

An organic solvent solution of purified polycarbonate resin (oil phase) can be obtained by repeating above-mentioned procedure once or the several times. The number of dust of 0.5 to 1.0 $\mu$m in the organic solvent solution of purified polycarbonate resin can be made 50,000 or below and further 30,000 or below per 1 g of polycarbonate resin. The organic solvent is removed from the organic solvent solution of purified polycarbonate resin to obtain solid polycarbonate resin. if necessary, the organic solvent is completely removed with a drier or pelletizing is conducted with an extruder, whereby a polycarbonate resin with a very small content of dusts useful for optical materials can be obtained.

The present invention provides a process for purifying a polycarbonate resin solution which comprises:

passing a water-in-oil dispersion type (W/O) emulsion composed of a mixture of an organic solvent solution containing a polycarbonate resin with a aqueous solution and having water particles with an average diameter of 1 to 100 $\mu$m in an oil through a primary metallic filter having a filtering precision of 1 to 100 $\mu$m, then, passing the mixture through a secondary metallic filter having a filtering precision of 1.1 to 20 times to a filtering precision of said primary metallic filter, and then, performing separation between the organic solvent solution containing a polycarbonate resin and the aqueous solution.

It is preferable that the primary metallic filter has a filtering precision of 1 to 100 $\mu$m. When the filtering precision of the primary metallic filter is below 1 $\mu$m, aggregation effect of the water particles is increased, but it is not preferable since breakage of the filtering material occurs due to blockage of the filter with minute contaminations and increase of pressure loss through the filter with viscosity of polycarbonate resin solution, and even if it is possible to use continuously the filter, it is not preferable since running cost is increased due to increase of regeneration frequency by shortening of regeneration life with contaminations and shortening of life until renewal. On the other hand, when the filtering precision is above 100 $\mu$m, capturing function of water particles is deteriorated, so that it is not preferable since growth of emulsion is depressed.

The material of the primary metallic filter may be a non-woven fabric or various textures, among which a non-woven fabric and a felt are preferable from the aspect of the depth.

The secondary metallic filter has preferably a filtering precision of 1.1 to 20 times and more preferably 2 to 10 times to a filtering precision of the primary metallic filter.

When the filtering precision of the secondary metallic filter is smaller than that of the primary metallic filter, pressure loss is rapidly increased, so that it is impossible to use for a long time. When the filtering precision of the secondary metallic filter is too larger than that of the primary metallic filter, it is not preferable since continuous separation is not performed due to extreme decrease of contact between particles of water droplet and in case of a high flow speed, water particles are again dispersed into minute particles to flow out. The material of the secondary metallic filter may be a wire netting according to various weaves, a metallic non-woven fabric or a felt.

It is preferable from the aspects of the period until regeneration and regeneration cost that the filtering material to be used for separation is as coarse as possible in the range able to attain continuous separation When separation is insufficient, it is possible to pile up several sheets of the primary metallic filter or increase the depth of the secondary metallic filter in the range of a specified filter depth. In order to remove minute contaminations in the polycarbonate resin, it is advantageous to provide with another accurate filter from the aspects of instrument cost and maintenance cost. Further, a protecting filter layer more coarse than the primary filter for removal of contaminations and reinforcement can be provided on the primary filter.

It is preferable that the materials of the primary filter and the secondary filter are a high energy material of the emulsion having a surface energy of 200 cal/cm$^3$ or above to cause intimate contact between oil and water, among which a metallic material is more preferable. Particularly, a metallic material containing 11 to 30% by weight of Cr is preferable. Examples of the metallic material include stainless steels particularly, austenitic stainless steel including, from the aspects of solvent resistance and corrosion resistance, SUS304, SUS304L, SUS316, SUS316L, SUS317, SUS317L and SUS347 and hastelloy, incoloy and Cr—Ni alloys, Cr—Co alloys.

The depth of the metallic filtering material suitable for regeneration is in the range of 0.1 to 5 mm. When the depth is below 0.1 mm, strength is insufficient, so that failure of separation due to breakage occurs. When it is above 5 mm, it is difficult to perform sufficient washing and activation during regeneration, so that it is not preferable since failure of separation occurs during reuse. The filtering material may be a texture or a non-woven fabric. A non-woven fabric is preferable from the aspects of filtering precision and thickness.

Use of the filtering material after treating with an acidic aqueous solution within a week before its use or at the time of its use can provide effective separation performance.

In the present invention, dipping treatment is performed for a new filtering media in advance before its use. As the method of dipping treatment, a filtering media is dipped in an acidic aqueous solution. Circulation dipping may be applied or an acidic aqueous solution may be passed through the filtering media set in a housing to be used. It is necessary to dip sufficiently the entire of the filtering media in an acidic aqueous solution. The metallic filtering media is often passivated with nitric acid in regeneration treatment. Unless acid treatment before its use in the present invention is performed for the filtering media which has completed regeneration treatments, separation performance cannot be sufficiently regained, although pressure loss and filtering precision is regained.

The acid to be used in the dipping treatment may be pH 4 or below. It is preferable to use mineral acids, phosphoric acid, nitric acid, sulfuric acid and hydrochloric acid which cause no degradation of quality due to mixing into the product. Particularly, when an austenitic stainless steel is treated, phosphoric acid which exerts no influence upon the filtering material and the polycarbonate product is most suitable.

Regarding the timing of acid treatment, when the timing is too early, it is not preferable since concentration of acid due to vaporization of water and progress of acid corrosion of the filtering media during dipping occur. It is preferable to perform usually acid treatment before a week of use of the filter or at the time of use of the filter.

The polycarbonate resin solution is neutralized with a mineral acid including phosphoric acid. Therefore, acid treatment before use can be replaced by passing an aqueous emulsion neutralized with an acid to pH 4 or below through the filter for a while, but it is better to treat in advance the filtering media with an acidic aqueous solution since degradation of quality of the product can be prevented until separation performance is increased.

DESCRIPTION OF THE PREFERRED EMBODIMENTS

The present invention will be described in more detail below, referring to Examples, which are not intended to limit the scope of the present invention.

Each properties were measured according to the following methods.

[The Number of Dust]

100 ml of a polycarbonate resin solution or an emulsion was sampled in a clean beaker and then the beaker was placed on a hot plate of surface temperature 120° C. to vaporize solvent and moisture, whereby a solid polycarbonate resin was obtained. 1 g of the solid polycarbonate resin was dissolved in 100 cc of methylene chloride and the number of dust with size 0.5 to 1.0 $\mu$m was measured with a minute particle counter, manufactured by Hiac-Royco Co. Ltd., type 4100. Even if the number of dust is measured according to any other measuring methods, there is not large difference of the measured value between measuring methods.

[Viscosity of Resin Emulsion]

The measurement was performed by E type rotary viscometer, manufactured by Tokyo Keiki k.k., Japan, trade name: Degital viscometer DV, L-B

[Diameter of Water Particle in Emulsion]

The measurement was performed by ultra-centrifugal type particle distribution automeasuring apparatus, manufactured by Horiba Seisakusho k.k., Japan, type No. CAPA-700.

[Viscosity Average Molecular Weight (Mv) of Polycarbonate Resin]

Intrinsic viscosity was measured by an Ubbelohde type slender tube viscometer and converted to viscosity average molecular weight by Schnell's formula.

[Water Content in Polycarbonate Resin Solution]

The measurement was performed by Karl Fisher's water meter, manufactured by Kyoto Electronics k.k., Japan, type No. MKA-210

[Filtering Precision]

The measurement was performed according to single pass F-2 test based on ANSI (American National Standard Institute) B93,31-1973.

[Use and Regeneration of Filter]

Regenerated or new filters were dipped in 3% phosphoric acid aqueous solution at a room temperature just before use, unless there is description that no treatment was performed just before use.

The regeneration of a filter was performed according to the following method. That is, the filter was dipped in 10% by weight caustic soda aqueous solution and heated up to 85° C. to decompose adhered resin components for 3 hours in an alkali and then rinsed with pure water until pH of rinsing water reached to 7.5 and then dipped in 10% nitric acid for one hour at a room temperature, followed by rinsing with pure water while applying ultrasonic until pH of rinsing water reached to 6.5 to 7. The filter thus treated was dried in a hot wind drier of 120° C.

EXAMPLE 1
[Synthesis of Polycarbonate Resin Solution]

3.7 kg of sodium hydroxide was dissolved in 42 L of water and 7 kg of bisphenol A as dihydric phenol and 29 g of hydrosulfite were dissolved therein. 35 L of methylene chloride (MC) was added thereto and 120 g of p-t-butyl phenol was added thereto with stirring and then 3.6 kg of phosgene was injected thereto over 60 minutes. After the completion of injection of phosgene, the reaction liquid was vigorously stirred to form an emulsion and then 8 g of triethylamine was added thereto and stirred for about one hour to polymerize. The mixture thus obtained was allowed to stand for 30 minutes. Thereby, the aqueous solution was separated from MC phase. The MC phase thus obtained was used in Example 1 as polycarbonate resin solution. 10 cc of the MC phase was sampled and the solvent was vaporized, thus obtaining a solid polycarbonate resin. The viscosity average molecular weight (Mv) of the solid polycarbonate resin was 28,500.

[Washing of Polycarbonate Resin Solution]

2 L of 1% sulfuric acid was added to 20 L of the polycarbonate resin solution by above-mentioned synthesis and then mixed with stirring with a homomixer, manufactured by Tokushu Kika Kogyo k.k., Japan, whereby a W/O (water-in-oil dispersion type) emulsion was prepared. The viscosity of the emulsion was 220 cp and the average diameter of water particles of the emulsion was 80 $\mu$m and the number of dust was 135,600/g.

[Purification of Polycarbonate Emulsion]

A filter (material: SUS316, non-woven fabric, filtering precision: 40 $\mu$m, size: 35 mm$\phi$×250 mm, depth 5 mm) was attached to a glass housing (casing: glass, attaching fixed parts: SUS316L). The emulsion above obtained was transferred under an applied pressure at the flow rate of 250 kg/h (space velocity: 0.21 cm/sec) from a mixing vessel to the filter (for the outlet from the interior of the filter) with a geared pump. At this time, the pressure loss through the filter was 0.2 kg/cm$^2$. Aggregation of water particles was observed on the metallic filter through the glass housing. The polycarbonate resin solution was withdrawn from the outlet of housing and then transferred to a separatory funnel and settling was performed for 5 minutes. The water content of methylene chloride phase was 0.2 w/v % and the number of dust was 22,500/g.

Comparative Example 1

The emulsion used in Example 1 was transferred directly to a separatory funnel without filtering with a filter and then settling was performed for one hour. The water content of methylene chloride phase was 3.2 w/v % and the number of dust was 110,500/g.

Comparative Example 2

The experiment was performed in the same manner as in Example 1 except that the time of settling in a separatory funnel was changed from 5 minutes to 30 seconds. The water content of methylene chloride phase was 2.5 w/v % and the number of dust was 100,450/g.

Comparative Example 3

The experiment was performed in the same manner as in Example 1 except that a filter (material: SUS316, non-woven fabric, filtering precision: 5 $\mu$m, size: 35 mm$\phi$×250 mm, depth 5 mm) was attached to the glass housing and the emulsion was transferred under an applied pressure at the flow rate of 50 kg/h (space velocity: 0.04 cm/sec) from a mixing vessel to the filter (for the outlet from the interior of the filter) with a geared pump. At this time, the pressure loss through the filter was 8.3 kg/cm$^2$. The polycarbonate resin solution was withdrawn from the outlet of housing and then transferred to a separatory funnel and settling was performed for 5 minutes. The water content of methylene chloride phase was 3.5 w/v % and the number of dust was 113,400/g.

EXAMPLE 2
[Synthesis of Polycarbonate Resin Solution]

3.7 kg of sodium hydroxide was dissolved in 42 L of water and 7 kg of bisphenol A as dihydric phenol and 29 g of hydrosulfite were dissolved therein. 35 L of methylene chloride (MC) was added thereto and 190 g of p-t-butyl phenol was added thereto with stirring and then 3.7 kg of phosgene was injected thereto over 60 minutes. After the completion of injection of phosgene, the reaction liquid was vigorously stirred to form an emulsion and then 8 g of triethylamine was added thereto and stirred for about one hour to polymerize. The mixture thus obtained was allowed to settle for 30 minutes. Thereby, the aqueous solution was separated from the MC phase. The MC phase thus thus obtained was used in Example 2 as polycarbonate resin solution. 10 cc of the MC phase was sampled and the solvent was vaporized, thus obtaining a solid polycarbonate resin. The viscosity average molecular weight (Mv) of the solid polycarbonate resin was 21,500.

[Washing of Polycarbonate Resin Solution]

2 L of 1% sodium hydroxide aqueous solution was added to 20 L of the polycarbonate resin solution by above-mentioned synthesis and then mixed with stirring with a homomixer, manufactured by Tokushu Kika Kogyo k.k., Japan, whereby a W/O (water-in-oil dispersion type) emulsion was prepared. The viscosity of the emulsion was 460 cp and the average diameter of water particles of the emulsion was 5 $\mu$m and the number of dust was 147,300/g.

[Purification of Polycarbonate Emulsion]

A filter (material: SUS316, non-woven fabric, filtering precision: 40 $\mu$m, size: 35 mm$\phi$×250 mm, depth 5 mm) was attached to a glass housing (casing: glass, attaching fixed parts: SUS316L). The emulsion above obtained was transferred under an applied pressure at the flow rate of 400 kg/h (space velocity: 0.34 cm/sec) from a mixing vessel to the filter (for the outlet from the interior of the filter) with a geared pump. At this time, the pressure loss through the filter was 0.4 kg/cm$^2$. Aggregation of water droplets was observed on the metallic filter through the glass housing. The polycarbonate resin solution was withdrawn from the outlet of housing and then transferred to a separatory funnel and settling was performed for 5 minutes. The water content of methylene chloride phase was 0.4 w/v % and the number of dust was 22,200/g.

Comparative Example 4

The emulsion used in Example 2 was transferred directly to a separatory funnel without filtering with a filter and then settling was performed for one hour. However, no separation between the organic phase and the aqueous phase occurred.

Comparative Example 5

The emulsion used in Example 2 was transferred to a strainer obtained on the market (pipe size: 1 inch, 40 mesh, linear diameter: 0.23 mm, porosity: 405 $\mu$m) at the rate of 250 kg/h.

The liquid overflowed from the strainer was transferred to a separatory funnel and then settling was performed for one hour. However, the state of the emulsion was still maintained. No separation between the organic phase and the aqueous phase occurred.

Comparative Example 6

The experiment was performed in the same manner as in Example 2 except that a filter (material: polypropylene, non-woven fabric, filtering precision: 30 µm, size: 53 mmφ× 254 mm, depth 20 mm) was attached to the glass housing and the emulsion was transferred under an applied pressure at the flow rate of 250 kg/h (space velocity: 0.14 cm/sec) from a mixing vessel to the filter (for the outlet from the interior of the filter) with a geared pump. At this time, the pressure loss through the filter was 0.2 kg/cm². Aggregation of water particles was observed on the metallic filter through the glass housing. The polycarbonate resin solution was withdrawn from the outlet of housing and then transferred to a separatory funnel and settling was performed for 20 minutes. The water content of methylene chloride phase was 2.7 w/v % and the number of dust was 92,500/g.

EXAMPLE 3

[Synthesis of Polycarbonate Resin Solution]

4.0 kg of sodium hydroxide was dissolved in 42 L of water and 7 kg of bisphenol A as dihydric phenol and 29 g of hydrosulfite were dissolved therein. 35 L of methylene chloride (MC) was added thereto and 240 g of p-t-butyl phenol was added thereto with stirring and then 3.9 kg of phosgene was injected thereto over 60 minutes. After the completion of injection of phosgene, the reaction liquid was vigorously stirred to form an emulsion and then 8 g of triethylamine was added thereto and stirred for about one hour to polymerize. The mixture thus obtained was allowed to stand for 30 minutes. Thereby, the aqueous solution was separated from the MC phase. The MC phase thus thus obtained in was used in Example 3 as polycarbonate resin solution. 10 cc of the MC phase was sampled and the solvent was vaporized, thus obtaining a solid polycarbonate resin. The viscosity average molecular weight (Mv) of the solid polycarbonate resin was 17,300.

[Washing of Polycarbonate Resin Solution]

2 L of 3 w/v % phosphoric acid aqueous solution was added to 20 L of the polycarbonate resin solution by above-mentioned synthesis and then mixed with stirring with a homomixer, manufactured by Tokushu Kika Kogyo k.k., Japan, whereby a W/O (water-in-oil dispersion type) emulsion was prepared. The viscosity of the emulsion was 220 cp and the average diameter of water particles of the emulsion was 50 µm.

[Purification of Polycarbonate Emulsion]

A filter (material: Hastelloy C, non-woven fabric, filtering precision: 10 µm, size: 50 mmφ×250 mm, depth 1 mm) was attached to a glass housing (casing: glass, attaching fixed parts: SUS316L). The emulsion above obtained was transferred under an applied pressure at the flow rate of 420 kg/h (space velocity: 0.25 cm/sec) from a mixing vessel to the filter (for the outlet from the interior of the filter) with a geared pump. At this time, the pressure loss through the filter was 0.4 kg/cm². Aggregation of water particles was observed on the metallic filter through the glass housing. The polycarbonate resin solution was withdrawn from the outlet of housing and then transferred to a separatory funnel and settling was performed for 10 minutes. The water content of methylene chloride phase was 0.2 w/v % and the number of dust was 9,500/g.

Comparative Example 7

The experiment was performed in the same manner as in Example 3 except one-direction rotary turbine blade (blade diameter 440 mm, blade width 15 mm, rotation number 120 rpm) was used instead of the homomixer. A W/O emulsion was obtained and the average diameter of water particles was 180 µm.

Then, a filter (material: SUS316, non-woven fabric, filtering precision: 30 µm, size: 52 mmφ×254 mm, depth 5 mm) was attached to a glass housing and the emulsion was transferred under an applied pressure at the flow rate of 50 kg/h (space velocity: 0.03 cm/sec) from a mixing vessel to the filter (for the outlet from the interior of the filter) with a geared pump. At this time, the pressure loss through the filter was 0.7 kg/cm². The polycarbonate resin solution was withdrawn from the outlet of housing and then transferred to a separatory funnel and settling was performed for 10 minutes. The water content of methylene chloride phase was 0.6 w/v % and the number of dust was 124,300/g.

EXAMPLE 4

[Synthesis of Polycarbonate Resin Solution]

25 L of water, 120 kg of bisphenol A as dihydric phenol and 0.6 g of hydrosulfite were dispersed and dissolved in 600 kg of 9% sodium hydroxide aqueous solution. 200 L of methylene chloride (MC) was added thereto and 2.6 kg of p-t-butyl phenol was added thereto with stirring and then 60 kg of phosgene was gradually injected thereto with stirring over 30 minutes. After the completion of injection of phosgene, 166 L of MC was added thereto and then 80 g of triethylamine was added thereto with vigorous stirring for about one hour to polymerize. The mixture thus obtained was allowed to stand for 30 minutes. Thereby, the aqueous solution (aqueous phase) was separated from the polycarbonate resin phase (oil phase). The procedure was repeated. A portion of the oil phase thus obtained was continuously withdrawn and used in Example 4 and Comparative Examples 8 and 9. 10 cc of the MC phase was sampled and the solvent was vaporized, thus obtaining a solid polycarbonate resin. The viscosity average molecular weight (Mv) of the solid polycarbonate resin was 28,000.

[Alkali Washing of Polycarbonate Resin Solution]

250 kg/h of the polycarbonate resin solution by above-mentioned synthesis (oil phase) was withdrawn and 50 L/h of 1% sodium hydroxide aqueous solution was added thereto and then mixed with stirring with a homomixer, manufactured by Tokushu Kika Kogyo k.k., Japan, whereby a W/O (water-in-oil dispersion type) emulsion was prepared. The viscosity of the emulsion was 220 cp and the average diameter of water particles of the emulsion was 20 µm.

[Purification of Polycarbonate Emulsion]

A filter (size: 52 mmφ×254 mm) with filtering decline composed of one sheet of plain fabric (material: SUS304, filtering precision: 250 µm, depth 0.43 mm) outside and one sheet of non-woven fabric (material: SUS304, filtering precision: 50 µm, depth 0.35 mm) inside was attached to a housing with a sight glass. A portion of the alkali-washed emulsion was transferred under an applied pressure at the flow rate of 250 kg/h from a mixing vessel to the filter (for the outlet from the interior of the filter) with a geared pump. At this time, the pressure loss through the filter was 0.2 kg/cm². The polycarbonate resin solution was continuously separated from the surface of secondary filtering layer and sampled from the outlet of the housing. The water content of the polycarbonate resin solution sample was 0.8 w/v %. When the integrated flow rate through the filter reached to 720 ton, the pressure loss reached to 1.5 kg/cm². Therefore, regeneration treatment of the filter was performed and used. The pressure loss was regained to 0.3 kg/cm² and water content was regained to 0.8 w/v %.

Comparative Example 8

A filter (size: 52 mmφ×254 mm) with filtering decline composed of one sheet of non-woven fabric (material: SUS304, filtering precision: 2 μm, depth 0.32 mm) outside and one sheet of non-woven fabric (material: SUS304, filtering precision: 50 μm, depth 0.35 mm) inside was attached to a housing with a sight glass. A portion of the emulsion used in Example 4 was transferred under an applied pressure at the flow rate of 250 kg/h from a mixing vessel to the filter (for the outlet from the interior of the filter) with a geared pump. At this time, the pressure loss through the filter was 0.7 kg/cm². The polycarbonate resin solution was continuously separated from the surface of secondary filtering layer and sampled from the outlet of the housing. The water content of the polycarbonate resin solution sample was 0.7 w/v %. When the integrated flow rate through the filter reached to 180 ton, the pressure loss reached to 1.5 kg/cm². Therefore, regeneration treatment of the filter was performed and used. The pressure loss was slightly regained to 0.9 kg/cm² and water content was slightly regained to 2.5 w/v %.

Comparative Example 9

A filter (filtering precision: 50 μm, depth 0.35 mm, size: 52 mmφ×254 mm, SUS304, non-woven fabric) was only degreased and then attached to a filter housing. A portion of the emulsion used in Example 4 was transferred under an applied pressure at the flow rate of 250 kg/h from a mixing vessel to the filter (for the outlet from the interior of the filter) with a geared pump. At this time, the pressure loss through the filter was 0.4 kg/cm². The polycarbonate resin solution was sampled from the outlet of the housing. The water content of the polycarbonate resin solution sample was 4.3 w/v %. Since the water content was not decreased even in passing for one hour, the passing was once stopped and the element was withdrawn and the resin was dissolved in methylene chloride with washing and then dipped in 5 w/v % phosphoric acid for 24 hours. After dipping treatment, the element was again attached to the filter-housing. A portion of the emulsion was transferred under an applied pressure at the flow rate of 250 kg/h from a mixing vessel to the filter (for the outlet from the interior of the filter) with a geared pump. At this time, the pressure loss through the filter was 0.4 kg/cm². The polycarbonate resin solution was sampled from the outlet of the housing. The water content of the polycarbonate resin solution sample was 0.8 w/v %.

EXAMPLE 5

[Acid Washing of Polycarbonate Resin Solution]

The polycarbonate of Example 4 was washed with alkali and subjected to liquid-liquid centrifugal separation. The polycarbonate resin solution (oil phase) thus obtained was withdrawn at the rate of 250 L/h and 30 L/h of 3% phosphoric acid was added thereto and then mixed with stirring with a homomixer, manufactured by Tokushu Kika Kogyo k.k., Japan, whereby a W/O (water-in-oil dispersion type) emulsion was prepared. The viscosity of the emulsion was 220 cp and the average diameter of water particles of the emulsion was 70 μm.

[Purification of Polycarbonate Emulsion]

A filter (size: 52 mmφ×254 mm) with filtering decline composed of two sheets of non-woven fabric (material: SUS316L, filtering precision: 50 μm, depth 0.35 mm) outside and one sheet of plain fabric (material: SUS316L, filtering precision: 700 μm, depth 0.7 mm) inside was attached to a housing with a sight glass. A portion of the alkali-washed emulsion was transferred under an applied pressure at the flow rate of 250 kg/h from a mixing vessel to the filter (for the outlet from the interior of the filter) with a geared pump. At this time, the pressure loss through the filter was 0.3 kg/cm². The polycarbonate resin solution had been already separated in the outlet of the housing and sampled from the outlet of the housing. The water content of the polycarbonate resin solution sample was 0.6 w/v %. When the integrated flow rate through the filter reached to 750 ton, the pressure loss reached to 1.2 kg/cm². Therefore, regeneration treatment of the filter was performed and used. The pressure loss was regained to 0.4 kg/cm² and water content was regained to 0.7 w/v %.

Comparative Example 10

A filter (size: 52 mmφ×254 mm) with filtering decline composed of two sheets of non-woven fabric (material: SUS316L, filtering precision: 50 μm, depth 0.35 mm) outside and one sheet of non-woven fabric (material: SUS316L, filtering precision: 10 μm, depth 0.32 mm) inside was attached to a housing with a sight glass. A portion of the emulsion used in Example 5 was transferred under an applied pressure at the flow rate of 250 kg/h from a mixing vessel to the filter (for the outlet from the interior of the filter) with a geared pump. At this time, the pressure loss through the filter was 0.8 kg/cm². The polycarbonate resin solution which had been already separated in the outlet of the housing was sampled from the outlet of the housing. The water content of the polycarbonate resin solution sample was 0.7 w/v %. When the integrated flow rate through the filter reached to 250 kg, the pressure loss reached to 1.6 kg/cm² Therefore, regeneration treatment of the filter was performed. However, the pressure loss in 80 ton of the integrated flow rate after reuse reached to 1.6 kg/cm².

According to the process of the present invention, separation between an organic solvent solution reduced impurities and dusts and an aqueous solution from a polycarbonate resin emulsion can be performed efficiently in a low cost and saving energy.

What is claimed is:

1. A process for purifying a polycarbonate resin solution which comprises:
    passing a water-in-oil dispersion (W/O) emulsion composed of a mixture of an organic solvent solution containing a polycarbonate resin with an aqueous solution and having water particles with an average diameter of 1 to 100 μm in an oil through a metallic filter having a filtering precision of 10 to 200 μm, and
    then, settling the mixture for 1 to 30 minutes to perform separation between the organic solvent solution containing a polycarbonate resin and the aqueous solution.

2. A process according to claim 1, wherein said metallic filter is a metallic fiber.

3. A process according to claim 1, wherein said metallic filter is a non-woven fabric composed of a metallic fiber.

4. A process according to claim 2, wherein said metallic filter has a depth of 0.2 to 50 mm.

5. A process according to claim 2, wherein said metallic filter is formed of a material composed of an austenitic stainless steel or a nickel alloy.

6. A process according to claim 5, wherein said metallic filter is formed of at least one material selected from the group consisting of SUS304, SUS304L, SUS316, SUS316L, SUS317, SUS317L and SUS347.

7. A process according to claim 1,
wherein said metallic filter has been pre-treated with an acid before said emulsion is passed through said metallic filter.

8. A process according to claim 1, wherein:
the organic solvent solution further contains dust as an impurity;
the dust migrates from the organic solvent solution to an interface between the organic solvent solution and the aqueous solution upon said settling of the mixture for 1 to 30 minutes; and
the organic solvent solution containing the polycarbonate resin is separated from the aqueous solution containing the interface with migrated dust.

9. A process for purifying a polycarbonate resin solution which comprises:
passing a water-in-oil dispersion (W/O) emulsion composed of a mixture of an organic solvent solution containing a polycarbonate resin with an aqueous solution and having water particles with an average diameter of 1 to 100 $\mu$m in an oil through a primary metallic filter having a filtering precision of 1 to 100 $\mu$m,
then, passing the mixture through a secondary metallic filter having a filtering precision of 1.1 to 20 times the filtering precision of said primary metallic filter, and
then, settling the mixture for 1 to 30 minutes to perform separation between the organic solvent solution containing a polycarbonate resin and the aqueous solution.

10. A process according to claim 9, wherein said secondary metallic filter has a filtering precision of 2 to 10 times the filtering precision of said primary metallic filter.

11. A process according to claim 9, wherein said primary and secondary metallic filters have a depth of 0.1 to 5 mm.

12. A process according to claim 9, wherein said primary and secondary metallic filters are formed of a material containing 11 to 30% by weight of Cr.

13. A process according to claim 9, wherein said primary and secondary metallic filters are formed of at least one material selected from the group consisting of SUS304, SUS304L, SUS316, SUS316L, SUS317, SUS317L and SUS347.

* * * * *